US007853802B2

(12) United States Patent
Soda et al.

(10) Patent No.: US 7,853,802 B2
(45) Date of Patent: Dec. 14, 2010

(54) INFORMATION PROCESSING SYSTEM, METHOD, AND APPARATUS, AND PROGRAM

(75) Inventors: Atsumu Soda, Tokyo (JP); Takayuki Takeda, Kanagawa (JP); Ichiro Munakata, Kanagawa (JP)

(73) Assignee: Sony Corporation, Tokyo (JP)

( * ) Notice: Subject to any disclaimer, the term of this patent is extended or adjusted under 35 U.S.C. 154(b) by 802 days.

(21) Appl. No.: 11/742,038

(22) Filed: Apr. 30, 2007

(65) Prior Publication Data

US 2007/0286423 A1 Dec. 13, 2007

(30) Foreign Application Priority Data

May 10, 2006 (JP) ............................ P2006-130971

(51) Int. Cl.
*H04L 9/32* (2006.01)
*H04L 9/00* (2006.01)
*H04N 7/167* (2006.01)

(52) U.S. Cl. .......................... 713/189; 380/44; 380/200; 380/201

(58) Field of Classification Search ......... 380/200–203, 380/29, 37, 44–45; 713/189, 193–194; 726/26–27, 726/31
See application file for complete search history.

(56) References Cited

U.S. PATENT DOCUMENTS

| | | | | |
|---|---|---|---|---|
| 7,231,043 B2 * | 6/2007 | Maeda | ....................... | 380/202 |
| 2004/0141614 A1 * | 7/2004 | Choi et al. | ................. | 380/200 |

FOREIGN PATENT DOCUMENTS

| | | | |
|---|---|---|---|
| WO | WO 2004/105308 A1 | 12/2004 | |
| WO | WO 2005/029765 A1 | 3/2005 | |

OTHER PUBLICATIONS

U.S. Appl. No. 11/738,669, filed Apr. 23, 2007, Soda et al.
"SMPTE Standard- for Television—HDTV Signal/Data Serial Interface", SMPTE Technology Committee N 26 on File Management and Networking Technology, CD Revision 0, SMPTE 292M, Jan. 22, 2004, pp. 1-14.
"SMPTE Standard for Television—24-bit Digital Audio Format for SMPTE 292M Bit-Serial Interface", Revision of ANSI/SMPTE 299M, 1997, pp. 1-23.

* cited by examiner

*Primary Examiner*—Hosuk Song
(74) *Attorney, Agent, or Firm*—Oblon, Spivak, McClelland, Maier & Neustadt, L.L.P.

(57) ABSTRACT

Disclosed herein is an information processing system including: a first information processing apparatus for transmitting a content including video and audio signals; and a second information processing apparatus for receiving the content. The first apparatus includes: a first key generator configured to generate a first key; a video encryptor configured to encrypt the video signal with the first key; an audio encryptor configured to encrypt the audio signal with the first key; and a transmitter configured to transmit the content including the encrypted video and audio signals. The second apparatus includes: a receiver configured to receive the content; a second key generator configured to generate a second key corresponding to the first key; a video decryptor configured to decrypt the encrypted video signal with the second key; and an audio decryptor configured to decrypt the encrypted audio signal with the second key.

13 Claims, 9 Drawing Sheets

FIG.5

| PREAMBLE 4 BITS | AUX DATA OR AUDIO DATA 4BITS | AES CHANNEL PAIR 1, SUBFRAME 2 (CH2) AUDIO DATA 20 BITS | V | U | C | P |

INFORMATION PROCESSING SYSTEM, METHOD, AND APPARATUS, AND PROGRAM

CROSS REFERENCES TO RELATED APPLICATIONS

The present invention contains subject matter related to Japanese Patent Application JP 2006-130971, filed in the Japanese Patent Office on May 10, 2006, the entire contents of which being incorporated herein by reference.

BACKGROUND OF THE INVENTION

1. Field of the Invention

The present invention relates to an information processing system, method, and apparatus, and a program therefor. In particular, the present invention relates to an information processing system, method, and apparatus, and a program therefor which achieve appropriate protection of an audio signal transferred with HD-SDI or the like.

2. Description of the Related Art

In recent years, studies of a technique for protecting a content such as a motion picture when transmitting the content have been carried on. For example, a technique for content protection using HD-SDI (Bit-Serial Digital Interface for High-Definition Television Systems) standardized in SMPTE (Society of Motion Picture and Television Engineers) 292M (see SMPTE, Television-Bit-Serial Digital Interface for High-Definition Television Systems, 2002) has been studied.

SMPTE 299M prescribes how to embed a 24-bit audio signal in an HD-SDI signal (see SMPTE, Television-24-Bit Digital Audio Format for SMPTE 299M Bit-Serial Interface, 2004).

SUMMARY OF THE INVENTION

Unfortunately, currently-studied techniques for content protection achieve protection of a video signal, without considering protection of the audio signal.

In view of such a situation, an advantage of the present invention is to achieve appropriate protection of the audio signal transferred with the HD-SDI or the like.

According to one embodiment of the present invention, there is provided an information processing system including a first information processing apparatus for transmitting a content having a video signal and an audio signal, and a second information processing apparatus for receiving the content. The first information processing apparatus includes: a first key generator configured to generate a first key; a video encryptor configured to encrypt the video signal with the first key generated by the first key generator in accordance with a predetermined system; an audio encryptor configured to encrypt the audio signal with the first key generated by the first key generator in accordance with the predetermined system; and a transmitter configured to transmit the content including the video signal encrypted by the video encryptor and the audio signal encrypted by the audio encryptor. The second information processing apparatus includes: a receiver configured to receive the content transmitted from the first information processing apparatus; a second key generator configured to generate a second key corresponding to the first key; a video decryptor configured to decrypt the encrypted video signal included in the content received by the receiver with the second key generated by the second key generator in accordance with the predetermined system; and an audio decryptor configured to decrypt the encrypted audio signal included in the content received by the receiver with the second key generated by the second key generator in accordance with the predetermined system.

According to another embodiment of the present invention, there is provided an information processing method employed in an information processing system including a first information processing apparatus for transmitting a content including a video signal and an audio signal and a second information processing apparatus for receiving the content. In detail, the first information processing apparatus performs the steps of: generating a first key; encrypting the video signal with the generated first key in accordance with a predetermined system; encrypting the audio signal with the generated first key in accordance with the predetermined system; and transmitting the content having the encrypted video signal and the encrypted audio signal. The second information processing apparatus performs the steps of: receiving the content transmitted from the first information processing apparatus; generating a second key corresponding to the first key; decrypting the encrypted video signal included in the received content with the generated second key in accordance with the predetermined system; and decrypting the encrypted audio signal included in the received content with the generated second key in accordance with the predetermined system.

In the information processing system and the information processing method according to the above-described embodiments of the present invention, the following processes are performed in the information processing system including the first information processing apparatus for transmitting the content including the video signal and the audio signal and the second information processing apparatus for receiving the content. That is, in the first information processing apparatus, the first key is generated; both of the video signal and the audio signal are encrypted with the generated first key in accordance with the predetermined system; and the content including the encrypted video signal and the encrypted audio signal is transmitted. Then, in the second information processing apparatus, the content transmitted from the first information processing apparatus is received; the second key corresponding to the first key is generated; and both of the encrypted video signal and the encrypted audio signal included in the received content are decrypted with the generated second key in accordance with the predetermined system.

According to yet another embodiment of the present invention, there is provided a first information processing apparatus for transmitting a content including a video signal and an audio signal, the apparatus including: a key generator configured to generate a key; a video encryptor configured to encrypt the video signal with the key generated by the key generator in accordance with a predetermined system; an audio encryptor configured to encrypt the audio signal with the key generated by the key generator in accordance with the predetermined system; and a transmitter configured to transmit the content including the video signal encrypted by the video encryptor and the audio signal encrypted by the audio encryptor.

The transmitter may further superimpose the key generated by the key generator on the content to transmit the key together with the content.

The transmitter may transmit the content using HD-SDI (Bit-Serial Digital Interface for High-Definition Television Systems) standardized in SMPTE (Society of Motion Picture and Television Engineers) 292M.

The predetermined system may be an AES (Advanced Encryption Standard) cipher.

Each of the key generator, the video encryptor, and the audio encryptor may perform its process in accordance with SMPTE 427M "Link Encryption for 1.5 Gb/s1 Serial Digital Interface".

According to yet another embodiment of the present invention, there is provided a first information processing method employed in an information processing apparatus for transmitting a content including a video signal and an audio signal, the method including the steps of: generating a key; encrypting the video signal with the generated key in accordance with a predetermined system; encrypting the audio signal with the generated key in accordance with the predetermined system; and transmitting the content including the encrypted video signal and the encrypted audio signal.

According to yet another embodiment of the present invention, there is provided a first program corresponding to the above-described first information processing method according to one embodiment of the present invention.

In the first information processing apparatus and method, and the first program according to the above-described embodiments of the present invention, the first key is generated; both of the video signal and the audio signal are encrypted with the generated first key in accordance with the predetermined system; and the content including the encrypted video signal and the encrypted audio signal is transmitted.

According to yet another embodiment of the present invention, there is provided a second information processing apparatus for, when a content including a video signal encrypted with a first key in accordance with a predetermined system and an audio signal encrypted with the first key in accordance with the predetermined system is transmitted from another information processing apparatus, receiving the content and decrypting the received content. In detail, the second information processing apparatus according to this embodiment of the present invention includes: a receiver configured to receive the content transmitted from the other information processing apparatus; a key generator configured to generate a second key corresponding to the first key; a video decryptor configured to decrypt the encrypted video signal included in the content received by the receiver with the second key generated by the key generator in accordance with the predetermined system; and an audio decryptor configured to decrypt the encrypted audio signal included in the content received by the receiver with the second key generated by the key generator in accordance with the predetermined system.

In the case where the content transmitted from the other information processing apparatus and received by the receiver has the first key superimposed thereon, the key generator may extract the first key from the content received by the receiver to generate the second key based on the first key.

The receiver may receive the content using HD-SDI (Bit-Serial Digital Interface for High-Definition Television Systems) standardized in SMPTE (Society of Motion Picture and Television Engineers) 292M.

The predetermined system may be an AES (Advanced Encryption Standard) cipher.

In the case where the video signal and the audio signal included in the content received by the receiver have been encrypted in accordance with SMPTE 427M "Link Encryption for 1.5 Gb/s1 Serial Digital Interface", each of the key generator, the video decryptor, and the audio decryptor may perform its process in accordance with the SMPTE 427M.

According to yet another embodiment of the present invention, there is provided a second information processing method employed in an information processing apparatus for, when a content including a video signal encrypted with a first key in accordance with a predetermined system and an audio signal encrypted with the first key in accordance with the predetermined system is transmitted from another information processing apparatus, receiving the content and decrypting the received content. In detail, the second information processing method according to this embodiment of the present invention includes the steps of: receiving the content transmitted from the other information processing apparatus; generating a second key corresponding to the first key; decrypting the encrypted video signal included in the received content with the generated second key in accordance with the predetermined system; and decrypting the encrypted audio signal included in the received content with the generated second key in accordance with the predetermined system.

According to yet another embodiment of the present invention, there is provided a second program corresponding to the above-described second information processing method according to one embodiment of the present invention.

In the second information processing apparatus and method, and the second program according to the above-described embodiments of the present invention, the following processes are performed when the content including the video signal encrypted with the first key in accordance with the predetermined system and the audio signal encrypted with the first key in accordance with the predetermined system is transmitted from the other information processing apparatus. That is, the content transmitted from the other information processing apparatus is received; the second key corresponding to the first key is generated; and both of the encrypted video signal and the encrypted audio signal included in the received content are decrypted with the generated second key in accordance with the predetermined system.

As described above, according to the above-described embodiments of the present invention, the video signal can be protected for content protection. In addition, the audio signal can also be protected for content protection.

BRIEF DESCRIPTION OF THE DRAWINGS

FIG. 5 is a diagram illustrating contents of CHn in the audio signal of FIG. 4;

DETAILED DESCRIPTION OF THE PREFERRED EMBODIMENTS

Hereinafter, embodiments of the present invention will be described. Correspondence between the constituent features of the present invention as recited in the appended claims and specific examples in the present specification or the accompanying drawings is exemplified as follows. Note that this preliminary description is meant to confirm that specific examples that support the present invention recited in the appended claims are described in the specification or the accompanying drawings. Therefore, even if there is a specific example that is described in the specification or the accompanying drawings but which is not described in this preliminary description as corresponding to any constituent feature of the present invention, that does not mean that this specific example does not correspond to any constituent feature. Conversely, even if a certain specific example is described in this preliminary description as corresponding to a certain constituent feature of the present invention, that does not mean that the certain specific example does not correspond to any other constituent feature.

Moreover, this preliminary description should not be interpreted as meaning that all inventive features that have their specific examples described in the specification or the accompanying drawings are recited in the appended claims. In other words, this preliminary description should not be interpreted as negating any inventive feature that has its specific example described in the specification or the accompanying drawings but is not recited in the appended claims of the present application, i.e., any inventive feature that may be claimed in a divisional application or additionally claimed in the present application by amendment in the future.

Figure 3:
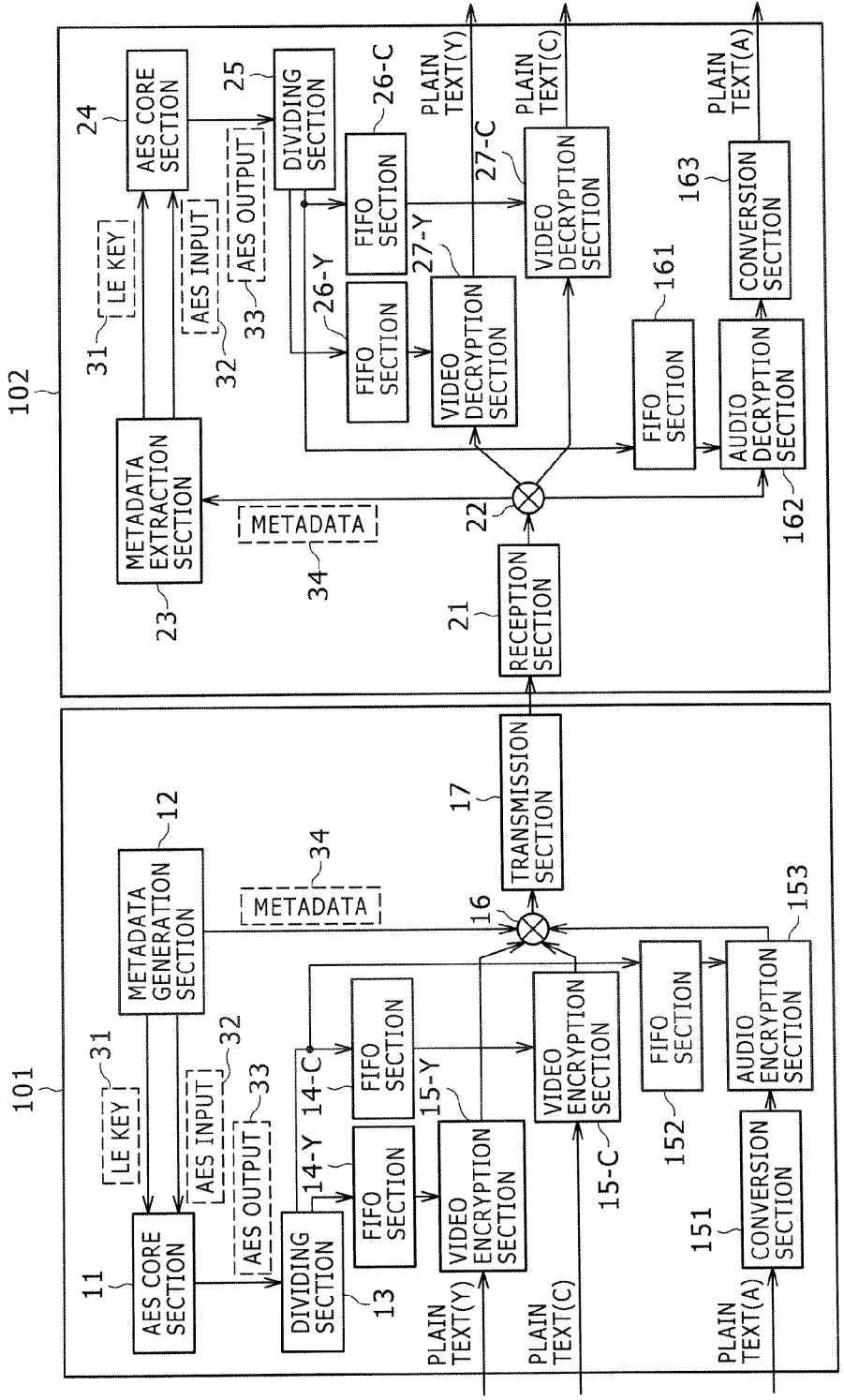
FIG. 3 is a diagram illustrating an exemplary configuration of a content protection system according to another embodiment of the present invention.

An information processing system (e.g., an information processing system of FIG. 3) according to one embodiment of the present invention is an information processing system including: a first information processing apparatus (e.g., an encryption apparatus 101 in FIG. 3) for transmitting a content including a video signal and an audio signal; and a second information processing apparatus (e.g., a decryption apparatus 102 in FIG. 3) for receiving the content, wherein, the first information processing apparatus includes a first key generator (e.g., a metadata generation section 12 in FIG. 3) configured to generate a first key, a video encryptor (e.g., an AES core section 11, a dividing section 13, FiFo sections 14-Y and 14-C, and video encryption sections 15-Y and 15-C in FIG. 3) configured to encrypt the video signal with the first key generated by the first key generator in accordance with a predetermined system, an audio encryptor (e.g., a conversion section 151, a FiFo section 152, and an audio encryption section 153 in FIG. 3) configured to encrypt the audio signal with the first key generated by the first key generator in accordance with the predetermined system, and a transmitter (e.g., a combining section 16 and a transmission section 17 in FIG. 3) configured to transmit the content including the video signal encrypted by the video encryptor and the audio signal encrypted by the audio encryptor, and wherein the second information processing apparatus includes a receiver (e.g., a reception section 21 and a separating section 22 in FIG. 3) configured to receive the content transmitted from the first information processing apparatus, a second key generator (e.g., a metadata extraction section 23 in FIG. 3) configured to generate a second key corresponding to the first key, a video decryptor (e.g., an AES core section 24, a dividing section 25, FiFo sections 26-Y and 26-C, and video decryption sections 27-Y and 27-C in FIG. 3) configured to decrypt the encrypted video signal included in the content received by the receiver with the second key generated by the second key generator in accordance with the predetermined system, and an audio decryptor (e.g., a FiFo section 161, an audio decryption section 162, and a conversion section 163 in FIG. 3) configured to decrypt the encrypted audio signal included in the content received by the receiver with the second key generated by the second key generator in accordance with the predetermined system.

A first information processing apparatus (e.g., the encryption apparatus 101 in FIG. 3) according to one embodiment of the present invention is an information processing apparatus for transmitting a content including a video signal and an audio signal, the apparatus including: a key generator (e.g., the metadata generation section 12 in FIG. 3) configured to generate a key; a video encryptor (e.g., the AES core section 11, the dividing section 13, the FiFo sections 14-Y and 14-C, and the video encryption sections 15-Y and 15-C in FIG. 3) configured to encrypt the video signal with the key generated by the key generator in accordance with a predetermined system; an audio encryptor (e.g., the conversion section 151, the FiFo section 152, and the audio encryption section 153 in FIG. 3) configured to encrypt the audio signal with the key generated by the key generator in accordance with the predetermined system; and a transmitter (e.g., the combining section 16 and the transmission section 17 in FIG. 3) configured to transmit the content including the video signal encrypted by the video encryptor and the audio signal encrypted by the audio encryptor.

The transmitter may further superimpose the key generated by the key generator on the content to transmit the key together with the content (in the information processing system of FIG. 3, for example, the key is superimposed on the content as metadata 34 and thus transmitted).

The predetermined system may be an AES (Advanced Encryption Standard) cipher.

Each of the key generator, the video encryptor, and the audio encryptor may perform its process in accordance with SMPTE 427M "Link Encryption for 1.5 Gb/s1 Serial Digital Interface" (for example, the key generator generates an LE key 31 in FIG. 3 as the key, and additionally generates an AES input 32 in FIG. 3, for example; in accordance with the AES cipher, the video encryptor uses the LE key and the AES input generated by the key generator to generate an AES output 33 in FIG. 3, for example, and uses the AES output to encrypt the video signal; and the audio encryptor uses the AES output generated by the video encryptor to encrypt the audio signal).

Figure 9:
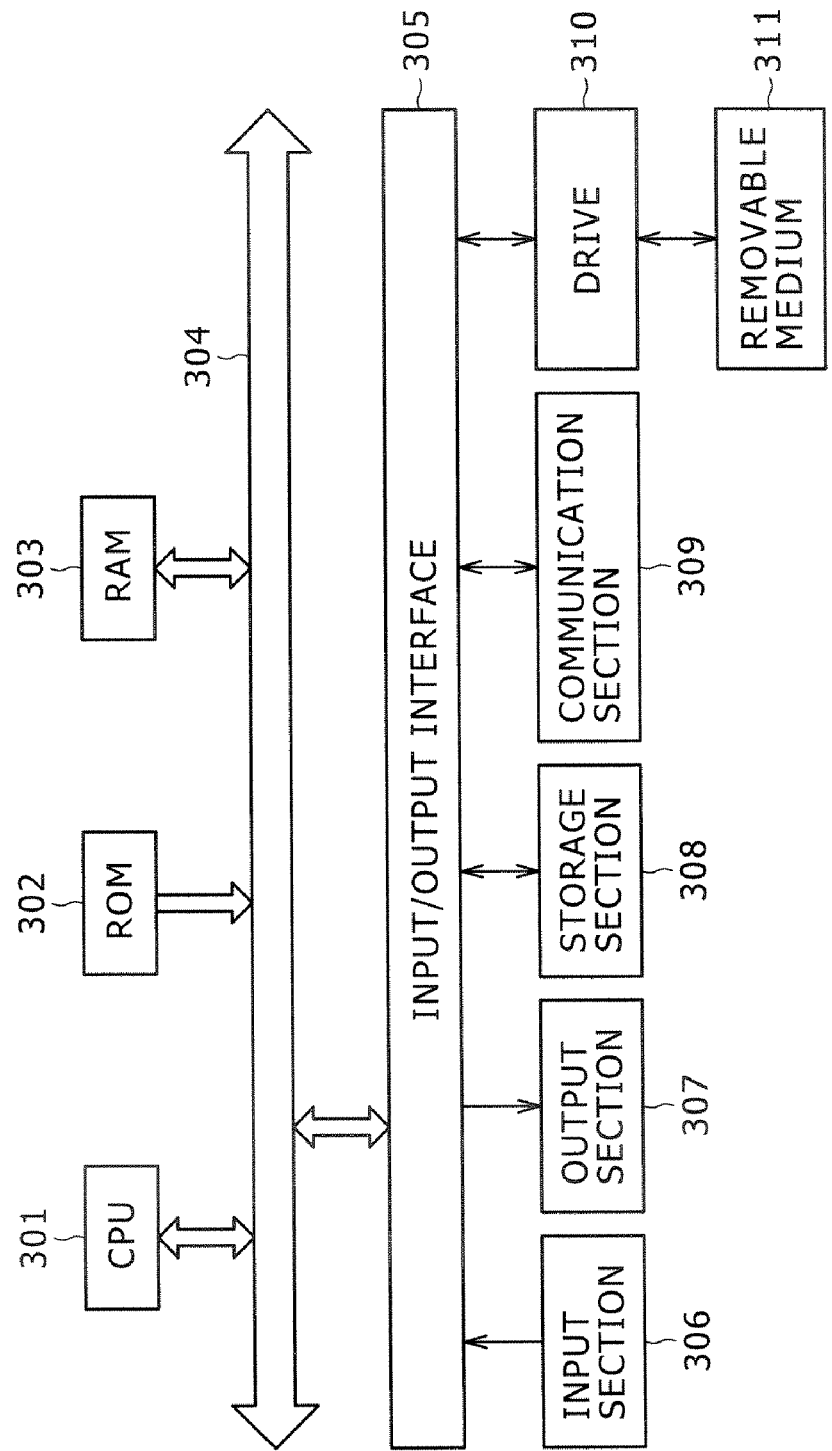
FIG. 9 is a block diagram illustrating an exemplary structure of a personal computer that executes a program according to one embodiment of the present invention.

A first information processing method and a first program each according to one embodiment of the present invention are, respectively, a method and a program corresponding to the above-described first information processing apparatus according to one embodiment of the present invention. The first program is executed by a computer as illustrated in FIG. 9 described below, for example.

A second information processing apparatus (the decryption apparatus 102 in FIG. 3) according to one embodiment of the present invention is an information processing apparatus for, when a content including a video signal encrypted with a first key in accordance with a predetermined system and an audio signal encrypted with the first key in accordance with the predetermined system is transmitted from another information processing apparatus (e.g., the encryption apparatus 101 in FIG. 3), receiving the content and decrypting the received content, the apparatus including: a receiver (e.g., the reception section 21 and the separating section 22 in FIG. 3) configured to receive the content transmitted from the other information processing apparatus; a key generator (e.g., the metadata extraction section 23 in FIG. 3) configured to generate a second key corresponding to the first key; a video decryptor (e.g., the AES core section 24, the dividing section 25, the FiFo sections 26-Y and 26-C, and the video decryption sections 27-Y and 27-C in FIG. 3) configured to decrypt the encrypted video signal included in the content received by the receiver with the second key generated by the key generator in accordance with the predetermined system; and an audio decryptor (e.g., the FiFo section 161, the audio decryption section 162, and the conversion section 163 in FIG. 3) configured to decrypt the encrypted audio signal included in the content received by the receiver with the second key generated by the key generator in accordance with the predetermined system.

In the case where the content transmitted from the other information processing apparatus and received by the receiver has the first key superimposed thereon (in the information processing system of FIG. 3, for example, the first key is superimposed on the content as the metadata 34), the key generator may extract the first key from the content received by the receiver to generate the second key based on the first key.

The predetermined system may be an AES (Advanced Encryption Standard) cipher.

In the case where the video signal and the audio signal included in the content received by the receiver have been encrypted in accordance with SMPTE 427M "Link Encryption for 1.5 Gb/s1 Serial Digital Interface" (for example, the first key is the LE key 31 in FIG. 3 used in the AES cipher; the encrypted video signal included in the content received by the receiver is the video signal encrypted using the AES output 33 in FIG. 3 generated from the LE key and the AES input 32 in FIG. 3 in accordance with the AES cipher; and the encrypted audio signal included in the content received by the receiver is the audio signal encrypted using the same AES output as that used for encrypting the video signal), each of the key generator, the video decryptor, and the audio decryptor may perform its process in accordance with the SMPTE 427M (for example, the key generator generates the LE key as the second key, and additionally generates the AES input; the video decryptor uses the LE key and the AES input generated by the key generator to reconstruct the AES output in accordance with the AES cipher, and uses the AES output to decrypt the encrypted video signal; and the audio decryptor uses the AES output reconstructed by the video decryptor to decrypt the encrypted audio signal).

A second information processing method and a second program each according to one embodiment of the present invention are, respectively, a method and a program corresponding to the above-described second information processing apparatus according to one embodiment of the present invention. The second program is executed by the computer as illustrated in FIG. 9 described below, for example.

As noted previously, the currently-studied techniques for content protection achieve protection of the video signal only, without considering protection of the audio signal. To facilitate understanding of the embodiments of the present invention, this disadvantage of the currently-studied techniques will now be described in detail below with reference to FIG. 1, before describing the embodiments of the present invention.

Figure 1:
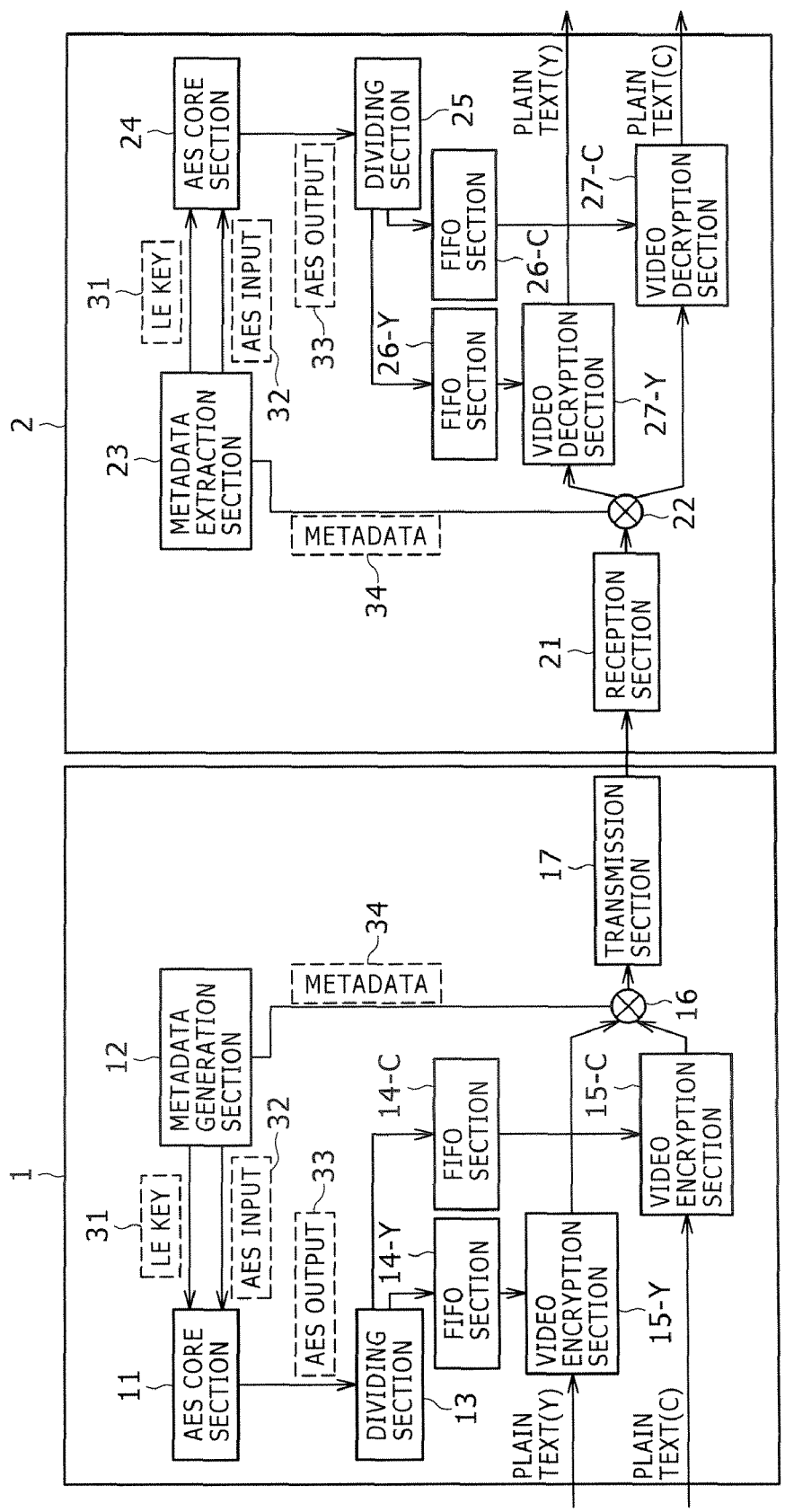
FIG. 1 is a diagram illustrating an exemplary configuration of a content protection system that complies with SMPTE 427M.

FIG. 1 illustrates an exemplary configuration of an information processing system for performing content protection (Link Encryption) by encrypting a video signal. This information processing system complies with SMPTE 427M "Link Encryption for 1.5 Gb/s1 Serial Digital Interface", which is in the course of standardization as of April 2006.

Hereinafter, an information processing system for performing content protection will be referred to as a "content protection system".

In FIG. 1, rectangles defined by a solid line represent an apparatus or a block as a component of the apparatus, whereas rectangles defined by a dotted line represent specific information. This also applies to other figures described below.

The content protection system of FIG. 1 includes an encryption apparatus 1 for encrypting a video signal, which is one component of a content, and a decryption apparatus 2 for decrypting the video signal encrypted by the encryption apparatus 1. Note that the video signal has been mentioned as one component of the content because the content normally includes not only the video signal but also an audio signal and other data as described below.

In this content protection system, it is assumed that HD-SDI standardized in SMPTE 292M is adopted for an interface between the encryption apparatus 1 and the decryption apparatus 2, for example. That is, in this content protection system, the encrypted video signal is transferred from the encryption apparatus 1 to the decryption apparatus 2 as a so-called HD-SDI signal.

In addition, in this content protection system, the video signal inputted to the encryption apparatus 1 and eventually outputted from the decryption apparatus 2 is in such a form that a luminance signal Y and a color signal C are separated from each other, as represented by "Plain Text (Y)" and "Plain Text (C)" in FIG. 1.

The encryption apparatus 1 uses an AES (Advanced Encryption Standard) cipher, which is one of symmetric-key cryptosystems, to encrypt the video signal. Accordingly, the encryption apparatus 1 includes an AES core section 11, a metadata generation section 12, a dividing section 13, FiFo sections 14-Y and 14-C, video encryption sections 15-Y and 15-C, a combining section 16, and a transmission section 17.

The AES core section 11 uses an LE key 31, which is a common key shared with a device on the decrypting side (i.e., the decryption apparatus 2 in the content protection system of FIG. 1), and an AES input 32 to generate an AES output 33 as data for directly encrypting the video signal in accordance with the AES cipher, and supplies the generated AES output 33 to the dividing section 13.

The LE key 31 and the AES input 32 are generated by the metadata generation section 12. Specifically, the metadata generation section 12 generates various types of information necessary for an encryption process performed in the encryption apparatus 1. In other words, the metadata generation section 12 generates various types of information necessary for a decryption process performed in the decryption apparatus 2, such as the aforementioned LE key 31 and AES input 32, a Frame reset, etc. In addition, the metadata generation section 12 generates data containing, out of these various types of information, the LE key 31 and some pieces of supplementary information. This data will be hereinafter referred to as "LEKP" (Link Encryption Key Payload). The metadata generation section 12 uses a public key of the decryption apparatus 2 to encrypt the LEKP in accordance with a 2048-bit RSA (R. Rivest, A. Shamir, and L. Adelman) encryption system, for example. This RSA encryption system will be hereinafter referred to as a "RSA cipher". Data obtained by encrypting the LEKP in accordance with the RSA cipher will be hereinafter referred to as "ELEKP". That is, the metadata generation section 12 generates the ELEKP. Then, the metadata generation section 12 generates metadata 34 containing the ELEKP, one component of the AES input 32, and the like, and supplies the generated metadata 34 to the combining section 16.

Figure 7:
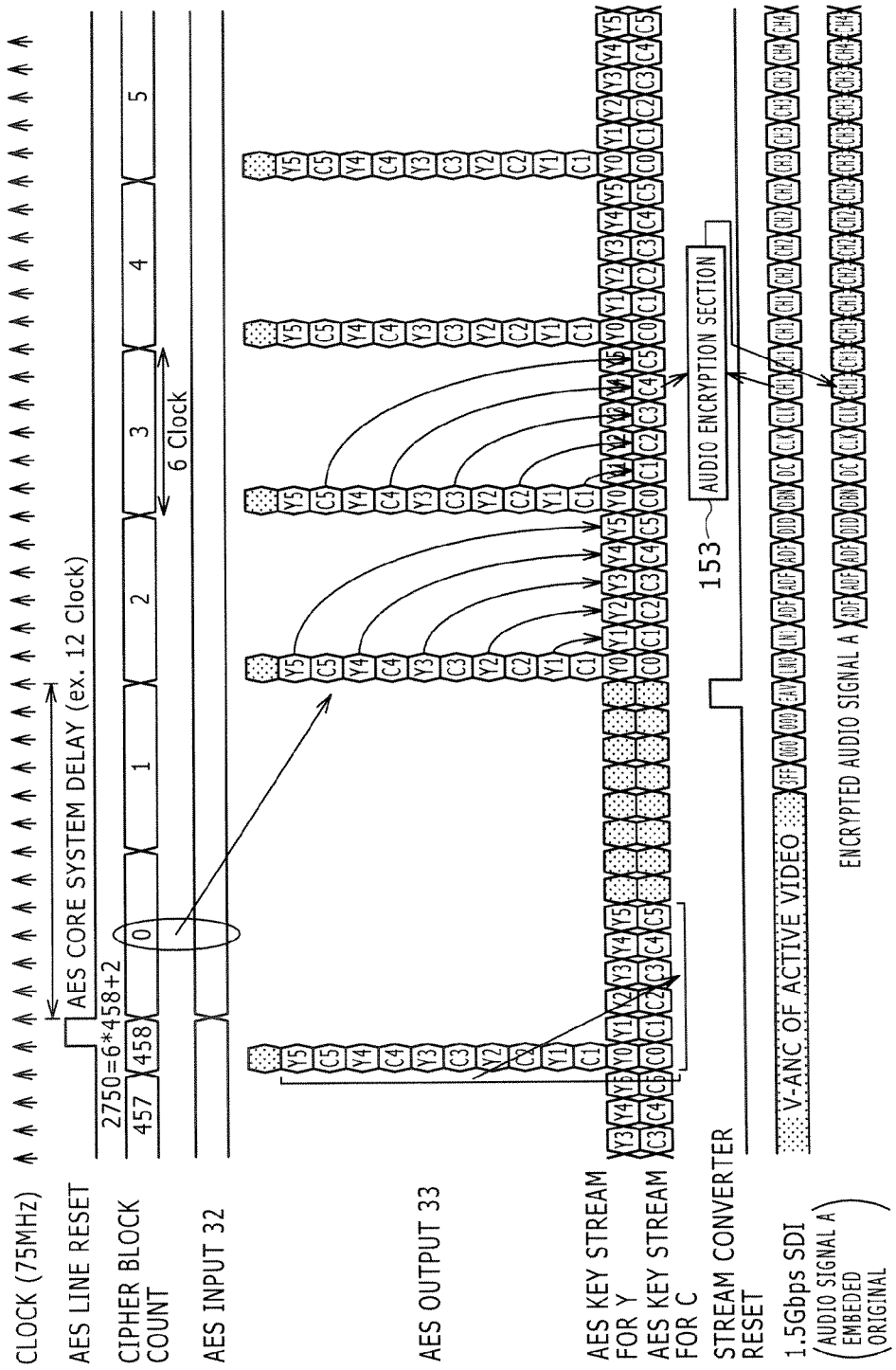
FIG. 7 is a timing chart for explaining an exemplary encryption process for an audio signal A performed by an encryption apparatus as illustrated in FIG. 3 or FIG. 6.

In this content protection system, the AES output 33 outputted from the AES core section 11 to the dividing section 13 is 128 bits long. The dividing section 13 divides, out of the 128 bits constituting the AES output 33, low-order 120 bits into pieces of 10-bit data each as a key (hereinafter referred to as an "AES key") that is actually used to encrypt the video signal, and supplies the pieces of 10-bit data to each of the FiFo sections 14-Y and 14-C sequentially. In FIG. 7 described below, each of hexagons that constitute the AES output 33, i.e., hexagons having Ck or Yk (k is an integer from 0 to 5) described therein, corresponds to one AES key.

Each of the FiFo sections 14-Y and 14-C supplies the 10-bit AES keys to the corresponding one of the video encryption sections 15-Y and 15-C sequentially in a FiFo (First In First Out) manner, as their name suggests. In other words, each of the FiFo sections 14-Y and 14-C outputs stream data (hereinafter referred to as an "AES key stream") in which the 10-bit AES keys are arranged continuously. Specifically, an "AES key stream for Y" as shown in FIG. 7 described below is one example of the AES key stream outputted from the FiFo section 14-Y to the video encryption section 15-Y, for example. Further, an "AES key stream for C" as shown in FIG. 7 described below is one example of the AES key stream outputted from the FiFo section 14-C to the video encryption section 15-C, for example.

The video encryption section 15-Y separates the luminance signal Y in the video signal into pieces of data each of a predetermined size (e.g., one word), and encrypts the luminance signal Y using each one of the 10-bit AES keys supplied from the FiFo section 14-Y sequentially for a separate one of the pieces of data of the predetermined size. Then, the video encryption section 15-Y supplies a resultant signal (hereinafter referred to as an "encrypted luminance signal Y") to the combining section 16. Meanwhile, the video encryption section 15-C separates the color signal C in the video signal into pieces of data each of a predetermined size (e.g., one word), and encrypts the color signal C using each one of the 10-bit AES keys supplied from the FiFo section 14-C sequentially for a separate one of the pieces of data of the predetermined size. Then, the video encryption section 15-C supplies a resultant signal (hereinafter referred to as an "encrypted color signal C") to the combining section 16.

Hereinafter, the encrypted luminance signal Y outputted from the video encryption section 15-Y and the encrypted color signal C outputted from the video encryption section 15-C will be referred to collectively as the "encrypted video signal".

The combining section 16 superimposes the metadata 34 generated by the metadata generation section 12 on, for example, a vertical blanking region of the encrypted video signal outputted from the video encryption sections 15-Y and 15-C, and supplies a resultant signal (hereinafter referred to as a "metadata-superimposed encrypted video signal") to the transmission section 17.

The transmission section 17 transmits the metadata-superimposed encrypted video signal supplied from the combining section 16 to the decryption apparatus 2 in the form of the HD-SDI signal. That is, the transmission section 17 performs a process of converting the form of the metadata-superimposed encrypted video signal into the form of the HD-SDI signal, and the like. For example, in the case where the metadata-superimposed encrypted video signal is inputted to the transmission section 17 as a parallel signal, the transmission section 17 performs parallel-to-serial conversion, and the like.

Thus, the metadata-superimposed encrypted video signal transmitted from the encryption apparatus 1 in the form of the HD-SDI signal is transferred to the decryption apparatus 2. The decryption apparatus 2 includes a reception section 21, a separating section 22, a metadata extraction section 23, an AES core section 24, a dividing section 25, FiFo sections 26-Y and 26-C, and video decryption sections 27-Y and 27-C.

The reception section 21 receives the metadata-superimposed encrypted video signal transmitted from the encryption apparatus 1 in the form of the HD-SDI signal, and supplies the received metadata-superimposed encrypted video signal to the separating section 22. At this time, the reception section 21 performs a process of converting the form of the metadata-superimposed encrypted video signal, for example, serial-to-parallel conversion and the like as necessary.

The separating section 22 separates each of the encrypted luminance signal Y, the encrypted color signal C, and the metadata 34 from the metadata-superimposed encrypted video signal received via the reception section 21, and supplies them to the video decryption section 27-Y, the video decryption section 27-C, and the metadata extraction section 23, respectively.

In other words, the metadata extraction section 23 extracts information such as the metadata 34 from the metadata-superimposed encrypted video signal supplied to the separating section 22. Then, the metadata extraction section 23 reconstructs, from the extracted information, the LE key 31, the AES input 32, and the like, and supplies them to the AES core section 24.

The AES core section 24 uses the LE key 31 and the AES input 32 supplied from the metadata extraction section 23 to reconstruct the AES output 33, and supplies the reconstructed AES output 33 to the dividing section 25.

The dividing section 25 divides, out of the 128 bits constituting the AES output 33, the low-order 120 bits into the 10-bit AES keys, and supplies the obtained 10-bit AES keys to each of the FiFo sections 26-Y and 26-C sequentially.

Each of the FiFo sections 26-Y and 26-C supplies the 10-bit AES keys to the corresponding one of the video decryption sections 27-Y and 27-C sequentially in the FiFo manner as their name suggests. That is, the FiFo sections 26-Y and 26-C output AES key stream similar to those outputted from the FiFo sections 14-Y and 14-C, respectively, of the encryption apparatus 1.

The video decryption section 27-Y separates the encrypted luminance signal Y supplied from the separating section 22 into pieces of data each of the predetermined size, for example, one word, and decrypts the encrypted luminance signal Y using each one of the 10-bit AES keys supplied from the FiFo section 26-Y sequentially for a separate one of the pieces of data of the predetermined size. The video decryption section 27-Y outputs the resulting reconstructed luminance signal Y to the outside sequentially.

Meanwhile, the video decryption section 27-C separates the encrypted color signal C supplied from the separating section 22 into pieces of data each of the predetermined size, for example, one word, and decrypts the encrypted color signal C using each one of the 10-bit AES keys supplied from the FiFo section 26-C sequentially for a separate one of the pieces of data of the predetermined size. The video decryption section 27-C outputs the resulting reconstructed color signal C to the outside sequentially.

As described above with reference to FIG. 1, SMPTE 427M, which is in the course of standardization as of April 2006, is a standard for the video signal. Accordingly, in the case where the content is transferred using the HD-SDI, SMPTE 427M achieves content protection by encryption of the video signal only. As is apparent from this fact, the protection of the audio signal is, at present, out of consideration for the content protection.

As noted above, however, the audio signal is commonly one component of the content. Therefore, it is desirable that not only the protection of the video signal but also the protection of the audio signal be carried out for the content protection. Thus, in order to protect the audio signal which is, for example, embedded in the HD-SDI signal as well by encryption as with the video signal, the present inventors have devised a content protection system having a configuration as illustrated in FIG. 2, for example, based on the content protection system of FIG. 1.

Figure 2:
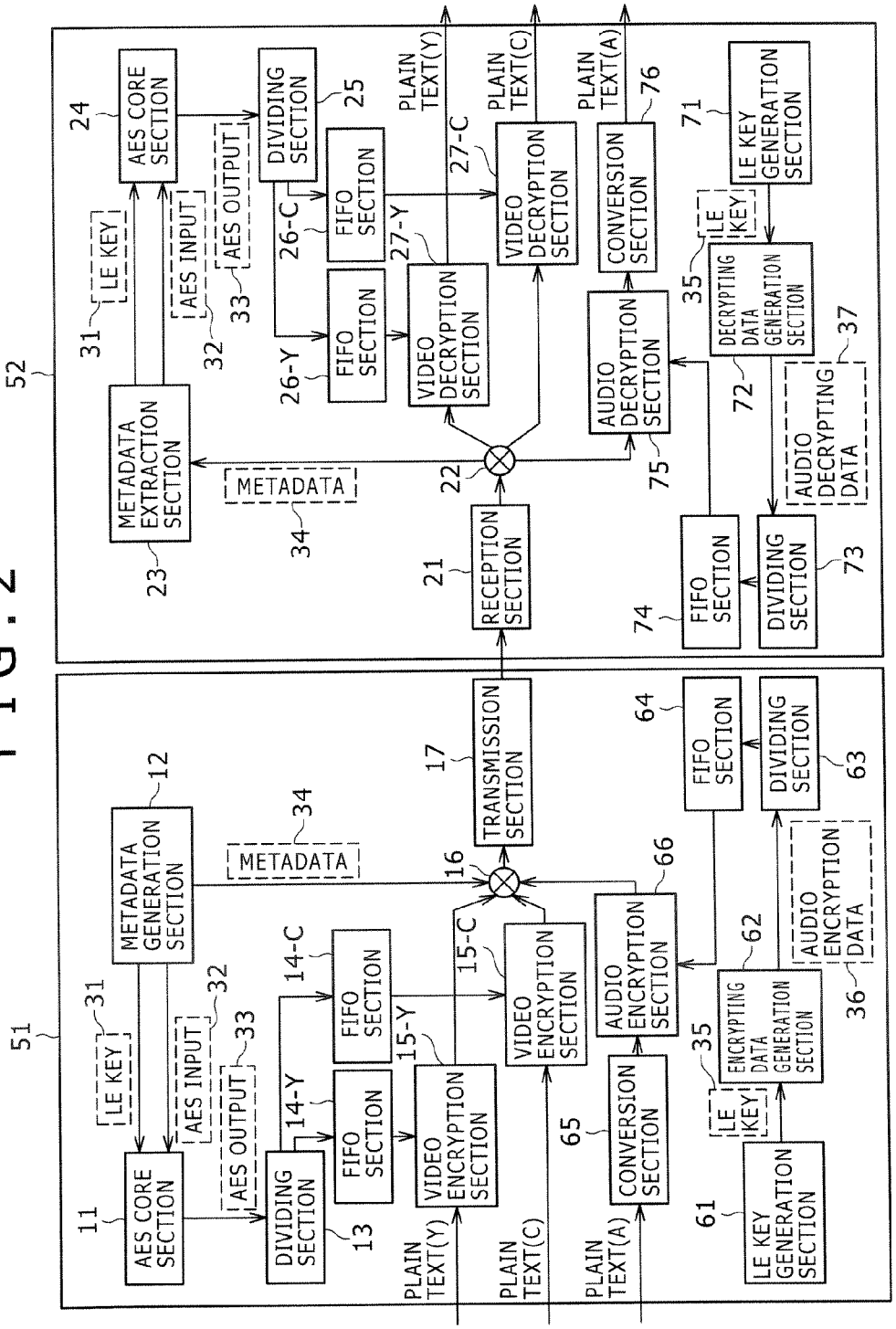
FIG. 2 is a diagram illustrating an exemplary configuration of a content protection system according to one embodiment of the present invention.

In FIG. 2, elements that have corresponding elements in FIG. 1 are denoted by the same reference numerals as the corresponding elements in FIG. 1, and descriptions of such elements are omitted as appropriate.

As compared to the encryption apparatus 1 as illustrated in FIG. 1, an encryption apparatus 51 in a content protection system of FIG. 2 additionally includes an LE key generation section 61, an encrypting data generation section 62, a dividing section 63, a FiFo section 64, a conversion section 65, and an audio encryption section 66 in order to encrypt an audio signal A.

The LE key generation section 61 generates an LE key 35 to be used exclusively for the audio signal A, and supplies the generated LE key 35 to the encrypting data generation section 62. The LE key 35 is different from and independent of the LE key 31.

The encrypting data generation section 62 uses the LE key 35 to generate data (hereinafter referred to as "audio encrypting data") 36 for directly encrypting the audio signal A, and supplies the generated audio encrypting data 36 to the dividing section 63.

The audio encrypting data 36 is generated in accordance with a predetermined symmetric-key cryptosystem. In the present embodiment, as in the encryption of the video signal, the audio encrypting data 36 is generated in accordance with the AES cipher, for example. Specifically, in the present embodiment, the audio encrypting data 36 is, for example, 128 bits long as the AES output 33 is. In other words, the AES core section 11 is an encryption engine for the video signal, and the AES output 33 is generated by the encryption engine. On the other hand, the encrypting data generation section 62 is an encryption engine used exclusively for the audio signal A and which is provided separately from and independent of the encryption engine used for the video signal. The audio encrypting data 36, which is different from the AES output 33, is generated by the encryption engine used exclusively for the audio signal A.

The dividing section 63 divides, out of the 128 bits constituting the audio encrypting data 36, low-order 120 bits into pieces of 10-bit data, and supplies the pieces of 10-bit data to the FiFo section 64 sequentially. Since the AES cipher is adopted in the encrypting data generation section 62 in the present embodiment, each piece of 10-bit data obtained by the dividing section 63 will also be referred to as the "AES key", hereinafter.

The FiFo section 64 supplies the 10-bit AES keys received from the dividing section 63 to the audio encryption section 66 sequentially in the FiFo manner as its name suggests. That is, the FiFo section 64 outputs an AES key stream used exclusively for the audio signal A.

The conversion section 65 performs, as necessary, a process of converting the audio signal A into a form that allows the audio signal A to be encrypted (e.g., the serial-to-parallel conversion, etc.), and supplies the audio signal A to the audio encryption section 66.

The audio encryption section 66 separates the audio signal A supplied from the conversion section 65 into pieces of data each of a predetermined size, for example, one word, and encrypts the audio signal A using each one of the 10-bit AES keys supplied from the FiFo section 64 sequentially for a separate one of the pieces of data of the predetermined size. Then, the audio encryption section 66 supplies a resultant signal (hereinafter referred to as an "encrypted audio signal A") to the combining section 16.

The combining section 16 superimposes the metadata 34 and additionally the encrypted audio signal A as a piece of metadata on the encrypted video signal, and supplies a resultant signal (hereinafter referred to as an "audio-metadata-superimposed encrypted video signal") to the transmission section 17.

Thus, the audio-metadata-superimposed encrypted video signal is transferred from the transmission section 17 of the encryption apparatus 51 to a decryption apparatus 52 in the form of the HD-SDI signal. As compared to the decryption apparatus 2 as illustrated in FIG. 1, the decryption apparatus 52 additionally includes an LE key generation section 71, a decrypting data generation section 72, a dividing section 73, a FiFo section 74, an audio decryption section 75, and a conversion section 76 to achieve decryption of the encrypted audio signal A.

The LE key generation section 71 generates a key identical to the LE key 35 used in the encryption apparatus 51, i.e., the LE key 35 used exclusively for the audio signal A, and supplies the generated key to the decrypting data generation section 72.

The decrypting data generation section 72 uses the LE key 35 to generate data (hereinafter referred to as "audio decrypting data") 37 for directly decrypting the encrypted audio signal A, and supplies the generated audio decrypting data 37 to the dividing section 73. That is, the audio decrypting data 37 is data used for decryption and corresponding to the audio encrypting data 36. In the present embodiment, the audio decrypting data 37 is 128 bits long.

The dividing section 73 divides, out of the 128 bits constituting the audio decrypting data 37, low-order 120 bits into 10-bit AES keys, and supplies the 10-bit AES keys to the FiFo section 74 sequentially.

The FiFo section 74 supplies the 10-bit AES keys to the audio decryption section 75 sequentially in the FiFo manner as its name suggests. That is, the FiFo section 74 outputs an AES key stream used exclusively for the audio signal A.

In addition, the encrypted audio signal A separated from the audio-metadata-superimposed encrypted video signal by the separating section 22 is supplied to the audio decryption section 75. Thus, the audio decryption section 75 separates the encrypted audio signal A into pieces of data each of the predetermined size, for example, one word, and decrypts the encrypted audio signal A using each one of the 10-bit AES keys supplied from the FiFo section 74 sequentially for a separate one of the pieces of data of the predetermined size. The audio decryption section 75 outputs the resulting reconstructed audio signal A to the conversion section 76 sequentially.

The conversion section 76 performs, as necessary, a process of converting the form of the audio signal A supplied from the audio decryption section 75, for example, the parallel-to-serial conversion, etc., and outputs the audio signal A to the outside.

Use of the content protection system having the above-described structure as illustrated in FIG. 2 enables not only the protection of the video signal (i.e., the luminance signal Y and the color signal C) in the HD-SDI signal using a technique of SMPTE 427M but also the protection of the audio signal A embedded in the HD-SDI signal in a similar manner.

Unfortunately, however, the content protection system having the structure as illustrated in FIG. 2 has the following two drawbacks (i.e., first and second drawbacks).

The first drawback is that, as described above, there is the need to determine an encryption system to be used exclusively for the audio signal A to provide, as an encryption circuit used exclusively for the audio signal A, the LE key generation section 61, the encrypting data generation section 62, the dividing section 63, the FiFo section 64, the conversion section 65, and the audio encryption section 66 in the encryption apparatus 51. Also, there is the need to provide, as a decryption circuit used exclusively for the audio signal A, the LE key generation section 71, the decrypting data generation section 72, the dividing section 73, the FiFo section 74, the audio decryption section 75, and the conversion section 76 in the decryption apparatus 52. In other words, the content protection system as illustrated in FIG. 2 has the first drawback in that the encryption apparatus 51 in FIG. 2 has an increased circuit scale as compared to the encryption apparatus 1 in FIG. 1 because the encryption apparatus 51 additionally includes the encryption circuit used exclusively for the audio signal A, and that the decryption apparatus 52 in FIG. 2 has an increased circuit scale as compared to the decryption apparatus 2 in FIG. 1 because the decryption apparatus 52 additionally includes the decryption circuit used exclusively for the audio signal A.

The second drawback is that there is the need to establish a new secure means for transferring the LE key 35 used exclusively for the audio signal A, because the LE key 35, which is a common key used for encrypting and decrypting the audio signal A, is used in addition to the LE key 31, which is the common key used for encrypting and decrypting the video signal, as described above.

The second drawback will now be described in more detail below.

For transmission with the HD-SDI, the symmetric-key cryptosystem is commonly adopted as a cryptographic algorithm due to its processing speed requirement. Thus, the AES cipher is adopted in the present embodiment. In this symmetric-key cryptosystem, the common key has to be possessed by both encrypting and decrypting sides, and failure to transfer the common key to both the encrypting and decrypting sides via a secure technique will result in a security hole and failure in content protection.

As secure techniques for transferring the common key, there are the following three techniques (i.e., first, second, and third techniques), in general. The first technique is a technique of embedding the common key in hardware. The second technique is a technique of using a public key cryptography to transfer the common key. The third technique is a technique of using the Diffie-Hellman key exchange algorithm to transfer the common key.

For example, the second technique is used as a secure technique for transferring the LE key 31, which is the common key used for the video signal. That is, as described above, the metadata generation section 12 encrypts the LE key 31 in accordance with the RSA cipher, which is one example of the public key cryptography, and allows the encrypted LE key 31 to be included in the metadata 34, which is superimposed by the combining section 16 on the encrypted video signal and transferred by the transmission section 17 to the decryption apparatus 52.

The content protection system as illustrated in FIG. 2 has the second drawback in that there is the need to establish the new secure means for transferring the LE key 35 used exclusively for the audio signal A, in addition to a secure means for transferring the LE key 31 used for the video signal.

For example, in the case where the above-described first technique is adopted as the new secure means for transferring the LE key 35 used exclusively for the audio signal A, i.e., in the case where the LE key 35 is embedded in the hardware, the second drawback amounts to the following drawback: a larger bunch of keys (as the LE key 35) need be embedded to secure a greater degree of security by shortening an interval of key exchange, and this results in an increased hardware scale.

Further, for example, in the case where the above-described second or third technique is adopted as the new secure means for transferring the LE key 35 used exclusively for the audio signal A, i.e., in the case where the public key cryptography or the Diffie-Hellman key exchange algorithm is used to transfer the common key, the second drawback amounts to the following drawback: an additional means for achieving the secure transfer of the LE key 35 may be required independently of the metadata generation section 12 and the metadata extraction section 23, and regardless of whether the additional means is implemented by software or hardware, the provision of the additional means results in an increased burden and heavy processing.

As such, the present inventors have further devised a content protection system as illustrated in FIG. 3 to overcome the above-described first and second drawbacks. FIG. 3 illustrates an exemplary configuration of a content protection system as an information processing system according to one embodiment of the present invention. This content protection system is different from the content protection system of FIG. 2.

In FIG. 3, elements that have corresponding elements in FIG. 1 are denoted by the same reference numerals as the corresponding elements in FIG. 1, and descriptions of such elements are omitted as appropriate.

As compared to the encryption apparatus 1 in FIG. 1, an encryption apparatus 101 in the content protection system of FIG. 3 additionally includes a conversion section 151, a FiFo section 152, and an audio encryption section 153 to achieve encryption of the audio signal A.

The conversion section 151 performs, as necessary, a process of converting the audio signal A into a form that allows the audio signal A to be encrypted, for example, the serial-to-parallel conversion, etc., and supplies the audio signal A to the audio encryption section 153.

The FiFo section 152 supplies the 10-bit AES keys supplied from the dividing section 13 to the audio encryption section 153 sequentially in the FiFo manner as its name suggests. That is, as described above with reference to FIG. 1, these 10-bit AES keys outputted from the dividing section 13 are the AES keys used when the video encryption section 15-C encrypts the color signal C in the video signal. In the content protection system of FIG. 3, these AES keys are supplied to the FiFo section 152 as well. In other words, in the content protection system of FIG. 3, the AES keys supplied to the FiFo section 152 (i.e., the AES keys used for encrypting the audio signal A) are not dedicated keys that are different from the AES keys used for encrypting the video signal but the same AES keys as those used for encrypting the video signal (i.e., the color signal C). Specifically, for example, the "AES key stream for C" as illustrated in FIG. 7 described below is supplied not only to the video encryption section 15-C via the FiFo section 14-C but also to the audio encryption section 153 via the FiFo section 152.

The audio encryption section 153 separates the audio signal A received from the conversion section 151 into pieces of data each of a predetermined size (e.g., one word), and encrypts the audio signal A using each one of the 10-bit AES keys (i.e., the AES keys used also for encrypting the color signal C) supplied from the FiFo section 152 sequentially for a separate one of the pieces of data of the predetermined size. Then, the audio encryption section 153 supplies the resulting encrypted audio signal A to the combining section 16.

The combining section 16 superimposes the metadata 34 and additionally the encrypted audio signal A as one piece of metadata on the encrypted video signal, and supplies the resulting audio-metadata-superimposed encrypted video signal to the transmission section 17.

Thus, the audio-metadata-superimposed encrypted video signal is transferred from the transmission section 17 of the encryption apparatus 101 to a decryption apparatus 102 in the form of the HD-SDI signal. As compared to the decryption apparatus 2 in FIG. 1, the decryption apparatus 102 additionally includes a FiFo section 161, an audio decryption section 162, and a conversion section 163 to achieve decryption of the encrypted audio signal A.

The FiFo section 161 supplies the 10-bit AES keys supplied from the dividing section 25 to the audio decryption section 162 sequentially in the FiFo manner as its name suggests. That is, as described above with reference to FIG. 1, these 10-bit AES keys outputted from the dividing section 25 are the AES keys used when the video decryption section 27-C decrypts the encrypted color signal C in the encrypted video signal. In the content protection system of FIG. 3, these AES keys are supplied to the FiFo section 161 as well. That is, in the content protection system of FIG. 3, the AES keys supplied to the FiFo section 161 (i.e., the AES keys used for decrypting the encrypted audio signal A) are not dedicated keys that are different from the AES keys used for decrypting the video signal but the same AES keys as those used for decrypting the video signal (i.e., the color signal C). Specifically, for example, the reconstructed "AES key stream for C" as illustrated in FIG. 7 described below is supplied not only to the video decryption section 27-C via the FiFo section 26-C but also to the audio decryption section 162 via the FiFo section 161.

The audio decryption section 162 separates the encrypted audio signal A received from the separating section 22 into pieces of data each of the predetermined size, for example, one word, and decrypts the encrypted audio signal A using each one of the 10-bit AES keys (i.e., the AES keys used also for decrypting the encrypted color signal C) supplied from the FiFo section 161 sequentially for a separate one of the pieces of data of the predetermined size. Then, the audio decryption section 162 outputs the resulting reconstructed audio signal A to the conversion section 163 sequentially.

The conversion section 163 performs, as necessary, a process of converting the form of the audio signal A received from the audio decryption section 162 (e.g., the parallel-to-serial conversion, etc.), and outputs the audio signal A to the outside.

To compare FIG. 3 with FIG. 2, the LE key generation section 61, the encrypting data generation section 62, and the dividing section 63, which are a part of the encryption circuit used exclusively for the audio signal A and necessary in the encryption apparatus 51 in FIG. 2, are not necessary in the encryption apparatus 101 in FIG. 3. Similarly, the LE key generation section 71, the decrypting data generation section 72, and the dividing section 73, which are a part of the decryption circuit used exclusively for the encrypted audio signal A and necessary in the decryption apparatus 52 in FIG. 2, are not necessary in the decryption apparatus 102 of FIG. 3. Thus, use of the content protection system in FIG. 3 achieves reduction in circuit scale as compared to the content protection system of FIG. 2. That is, the use of the content protection system of FIG. 3 results in overcoming the first drawback of the above-described content protection system of FIG. 2.

Moreover, in the content protection system of FIG. 3, the LE key 31 used for encrypting and decrypting the video signal is also used as the common key for encrypting and decrypting the audio signal A. This eliminates the need to establish the new secure means for transferring the common key used exclusively for the audio signal A. That is, the use of the content protection system of FIG. 3 results in overcoming the second drawback of the above-described content protection system of FIG. 2.

In the present embodiment, for an interface of the content protection system of FIG. 3, i.e., for an interface between the encryption apparatus 101 and the decryption apparatus 102, the HD-SDI standardized in SMPTE 292M is adopted as described above.

Figure 4:
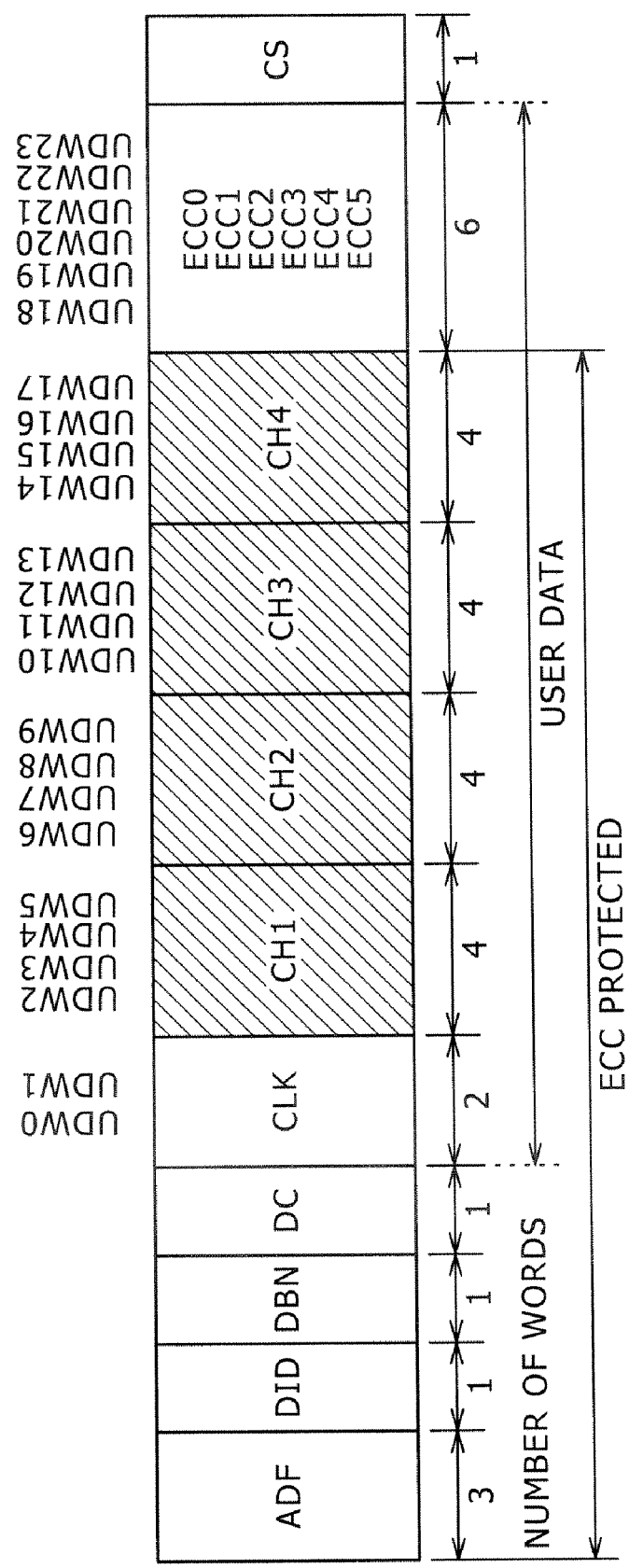
FIG. 4 is a diagram illustrating an exemplary structure of an audio signal to be embedded in an HD-SDI signal.

SMPTE 299M prescribes that the audio signal has to be embedded in the HD-SDI signal in an audio data packet format as illustrated in FIG. 4. That is, the audio signal is also one piece of metadata.

Referring to FIG. 4, the packet structure of an audio data packet of the audio signal will now be described below briefly.

As illustrated in FIG. 4, the audio data packet of the audio signal has a packet structure in which pieces of information such as ADF (Ancillary Data Flag), DID (Data Identification), DBN (Data Block Number), DC (Data Count), user data, CS (Check Sum), etc., are arranged in this order. The user data in the audio data packet of the audio signal is 24-word data as represented by UDW0 to UDW23 in FIG. 4. Specifically, the user data includes CLK (audio clock phase data), CHn (where n is an integer from 1 to 4) (audio data), and ECC (Error correction codes).

The CLK indicated by UDW0 and UDW1 in FIG. 4 is results of measurement of phases of a sampling clock of the input audio signal and the video signal.

Each of the CHn indicated by UDW2 to UDW17 in FIG. 4 is a 4-word data packet obtained by converting actual data called an "AES subframe" in the input audio signal into a data packet. The structure of the AES subframe is illustrated in FIG. 5, but the details of this structure are not described herein for the sake of simplicity. For the details thereof, see FIG. 1 and its description in the specifications of SMPTE 299M.

The ECC indicated by UDW18 to UDW23 in FIG. 4 is information that is added for detection and correction of a transmission error.

Thus, the audio signal embedded in the HD-SDI signal need to have the packet structure of the audio data packet as illustrated in FIG. 4. Accordingly, since the encrypted audio signal A that is transferred in the content protection system of FIG. 3 from the encryption apparatus 101 to the decryption apparatus 102 is embedded in the HD-SDI signal, the encrypted audio signal A need to maintain the packet structure of the audio data packet as illustrated in FIG. 4.

Accordingly, in order for the encrypted audio signal A to maintain the packet structure of the audio data packet as illustrated in FIG. 4, the encryption apparatus 101 may handle the audio signal A in the following manner.

In the packet structure as illustrated in FIG. 4, the ADF, the DID, the DBN, and the DC stay unchanged even after the audio signal A is encrypted. That is, the ADF, the DID, the DBN, and the DC are information that should not be encrypted. The CS is information that need be recalculated in accordance with data change as a result of the encryption of the audio signal A so that the CS will have a proper value as the CS of the packet on a transmission path.

Regarding the CLK indicated by UDW0 and UDW1 in FIG. 4, if the CLK is encrypted together with the CHn, which is the actual data of the audio signal A, a PLL included in a receiver that does not support the encryption of the audio signal A and which is used for recovering the sampling clock of the audio signal may be unable to be locked, so that the audio signal A and the video signal fail to be synchronized with each other. Therefore, the CLK is information that should not be encrypted to ensure compatibility, as the ADF, the DID, etc., are.

Further, regarding the ECC indicated by UDW18 to UDW23 in FIG. 4, if the ECC is recalculated and replaced by new ECC when the CHn, which is the actual data of the audio signal A, is encrypted, the new ECC is ECC for actual data of the encrypted audio signal A. This means a loss of a means for the transmission error detection and correction for the actual data of the original audio signal A. Therefore, the ECC is also information that should not be encrypted. Moreover, not recalculating the ECC enables a receiver that does not support the audio signal to detect an ECC error, and therefore, it becomes possible to mute the audio signal to be outputted from the receiver based on this information.

In view of the above, out of the pieces of information in the audio signal A having the packet structure as illustrated in FIG. 4 and embedded in the HD-SDI signal, the CHn, which is the actual data of the audio signal A, i.e., 16 words beginning with UDW2 and ending with UDW17 in FIG. 4, is information that should be encrypted.

Thus, the encryption apparatus 101 in FIG. 3 performs an encryption process of, for example: encrypting bit7 to bit0 of each of UDW2 to UDW17; recalculating even parity based on a result of the encryption of bit7 to bit0 to assign an even parity bit to bit8; assigning a reverse of bit8 to bit9; and prohibiting the encryption of remaining data (this encryption process will be hereinafter referred to as a "packet structure-maintaining encryption process"). This allows the protection of the audio signal A using encryption while maintaining the structure as the audio data packet as illustrated in FIG. 4.

In this case, when decrypting the encrypted audio signal A while maintaining the structure as the audio data packet as illustrated in FIG. 4, the decryption apparatus 102 may perform a decryption process of, for example, decrypting the CHn, which is the actual data of the audio signal A, i.e., only the 16 words beginning with UDW2 and ending with UDW17 in FIG. 4. This decryption process will be hereinafter referred to as a "packet structure-maintaining decryption process".

Figure 6:
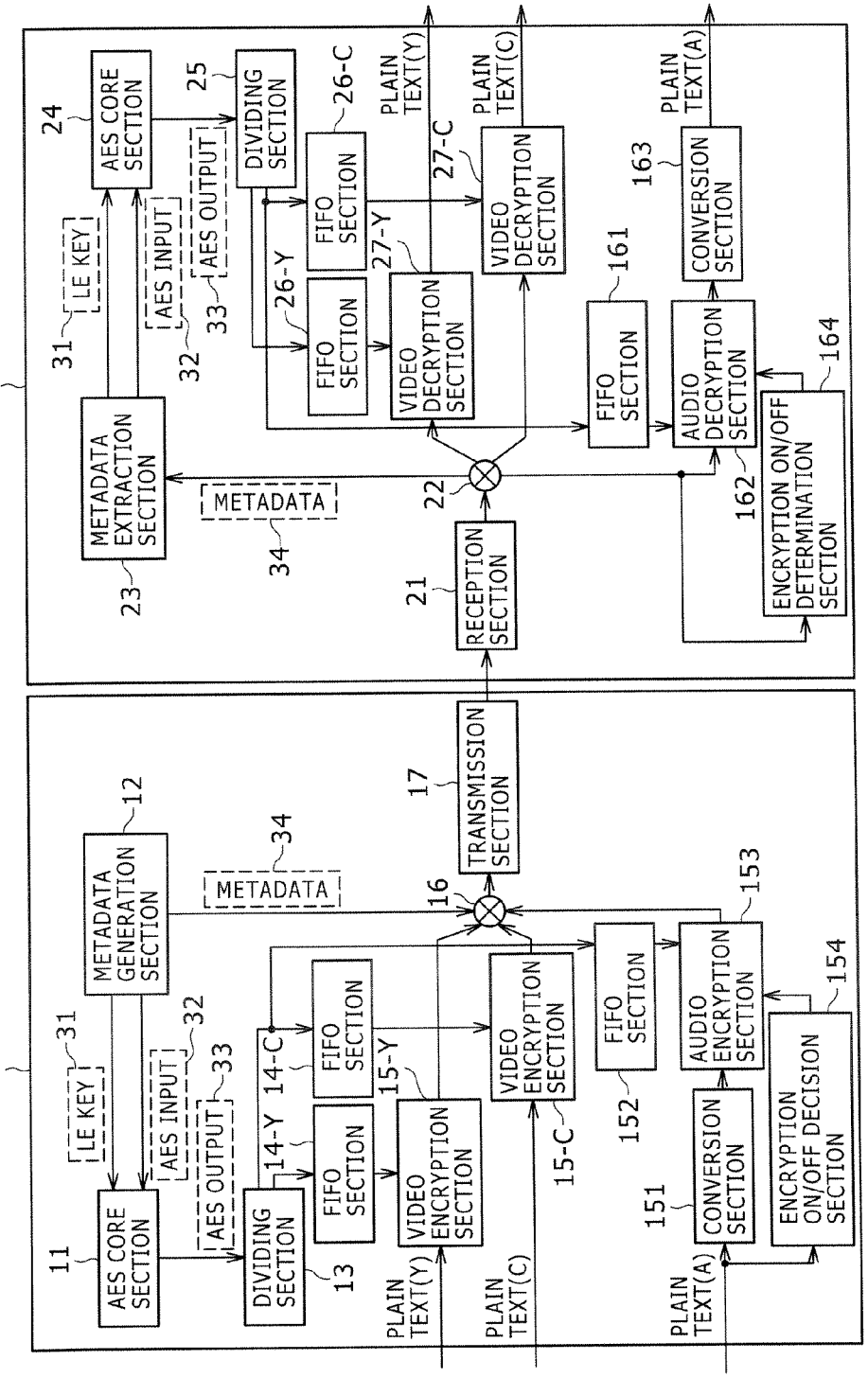
FIG. 6 is a diagram illustrating an exemplary configuration of a content protection system according to yet another embodiment of the present invention.

While the packet structure-maintaining encryption process itself is performed by the audio encryption section 153 in FIG. 3, control of this process (i.e., decision about which parts of the audio data packet as illustrated in FIG. 4 should be encrypted and which parts of the audio data packet should not be encrypted, or control of various processes based on a result of this decision) may be performed either based on judgment of the audio encryption section 153 itself or by another block such as an encryption On/Off decision section 154 as illustrated in FIG. 6. Similarly, while the packet structure-maintaining decryption process itself is performed by the audio decryption section 162 of FIG. 3, control of this process (i.e., determination of which parts of the audio data packet as illustrated in FIG. 4 have been encrypted and which parts of the audio data packet have not been encrypted, or control of various processes based on a result of this determination) may be performed either based on judgment of the audio decryption section 162 itself or by another block such as an encryption On/Off determination section 164 as illustrated in FIG. 6.

FIG. 6 illustrates an exemplary configuration of a content protection system as an information processing system according to another embodiment of the present invention. This content protection system is different from the content protection system of FIG. 3. In FIG. 6, elements that have corresponding elements in FIG. 3 are denoted by the same reference numerals as the corresponding elements in FIG. 3, and descriptions of such elements are omitted as appropriate. As compared to the encryption apparatus 101 in FIG. 3, an encryption apparatus 201 in the content protection system of FIG. 6 additionally includes the aforementioned encryption On/Off decision section 154. As compared to the decryption apparatus 102 in FIG. 3, a decryption apparatus 202 in the content protection system of FIG. 6 additionally includes the aforementioned encryption On/Off determination section 164.

In the content protection system of FIG. 2 also, in the case where the HD-SDI is adopted as the interface between the encryption apparatus 51 and the decryption apparatus 52 as in the present embodiment, the packet structure-maintaining encryption process and the packet structure-maintaining decryption process need be performed. In this case, while the packet structure-maintaining encryption process itself is performed by the audio encryption section 66 in FIG. 2, control of this process may be performed either based on judgment of the audio encryption section 66 itself or by another block not shown. Similarly, while the packet structure-maintaining decryption process itself is performed by the audio decryption section 75 in FIG. 2, control of this process may be performed either based on judgment of the audio decryption section 75 itself or by another block not shown.

Next, referring to FIG. 7, the encryption process for the audio signal A performed by the encryption apparatus 101 in FIG. 3 or the encryption apparatus 201 in FIG. 6 will now be described below. FIG. 7 is a timing chart illustrating an exemplary encryption process for the audio signal A in the case where, in an AES 128-bit CTR mode, the AES key stream used for the color signal C among the video signal is used also as the AES key stream for the audio signal A.

Specifically, FIG. 7 illustrates a timing chart concerning (from top to bottom in the figure) Clock, AES Line Reset, Cipher Block Count, AES input 32, AES output 33, AES key stream for Y, AES key stream for C, Stream Converter Reset, 1.5 Gbps SDI (Audio Signal A Embedded Original), and Encrypted Audio Signal A.

Clock refers to a video clock at approximately 75 MHz, or accurately 74.25 MHz or 74.147 MHz.

AES Line Reset refers to a reset signal that is applied to the AES core section 11 a system delay (e.g., a time corresponding to 12 clock cycles as indicated by "AES Core System delay (ex. 12clock)" in the example of FIG. 4) of the AES core section 11 in advance, so that the first AES output 33 for a frame that is to be encrypted will be outputted from the AES core section 11 in FIG. 3 and so on so as to be coincident in phase with a sample immediately following EAV of the video signal (in the example of FIG. 7, so as to be coincident in phase with data represented by a hexagon having "LN0" described therein in 1.5 Gbps SDI (Audio Signal A Embedded Original)).

Cipher Block Count refers to the lowermost counter of the AES core section 11 operating in the CTR (counter) mode. This counter is incremented each time the AES output 33 is outputted from the AES core section 11 (in the example of FIG. 7, every 6 clock cycles). An expression "2750=6*458+2" above the timing chart of Cipher Block Count in FIG. 7 means the following. Although not shown, one-frame data of the video signal as the HD-SDI signal is composed of 2750 words, which are the EAV, H-ANC, SAV, and Active Video or V-ANC arranged in this order. The left-hand side of the above expression is the data amount of the one-frame data (i.e., 2750 words). Specifically, the one-frame data is separated into 6-word blocks, and the AES output 33 is assigned to each 6-word block. Each one of the AES keys divided from the assigned AES output 33 is used for a separate one of the 6 words that constitute the block, and the words are encrypted one after another at each clock cycle. The expression "2750=6*458+2" shows the above.

As described above, the AES output 33 is divided into the 10-bit AES keys in the dividing section 13 in FIG. 3 and so on. In FIG. 7, each 10-bit AES key is represented by one hexagon. Note that gray hexagons having no characters described therein represent absence of data. Hereinafter, characters within the hexagons in FIG. 7 will be used, as appropriate, to distinguish the AES keys from one another.

AES keys Y0 to Y5 divided from each AES output 33 and supplied to the FiFo section 14-Y are supplied to the video encryption section 15-Y sequentially in an order of the AES key Y0, the AES key Y1, the AES key Y2, the AES key Y3, the AES key Y4, and the AES key Y5. As illustrated in FIG. 7, the AES output 33 is outputted from the AES core section 11 every 6 clock cycles. As a result, the AES keys Y0 to Y5 divided from each AES output 33 in the dividing section 13 are supplied as the AES key stream to the video encryption section 15-Y via the FiFo section 14-Y. This is represented by the "AES key stream for Y" in FIG. 7.

Similarly, AES keys C0 to C5 divided from each AES output 33 and supplied to the FiFo section 14-C are supplied to the video encryption section 15-C sequentially in an order of the AES key C0, the AES key C1, the AES key C2, the AES key C3, the AES key C4, and the AES key C5. As illustrated in FIG. 7, the AES output 33 is outputted from the AES core section 11 every 6 clock cycles. As a result, the AES keys C0 to C5 divided from each AES output 33 in the dividing section 13 are supplied as the AES key stream to the video encryption section 15-C via the FiFo section 14-C. This is represented by the "AES key stream for C" in FIG. 7.

In the content protection systems of FIGS. 3 and 6, the "AES key stream for C" is also used as the AES key stream for encrypting the audio signal A, as illustrated in FIG. 7. That is, the "AES key stream for C" is also supplied to the audio encryption section 153 via the FiFo section 152. Then, the audio encryption section 153 encrypts the audio signal A one word after another, using the AES keys C0 to C5 included in the "AES key stream for C" one by one.

Specifically, in FIG. 7, below Stream Converter Reset as a reference pulse that indicates an encryption start phase of the video signal, the HD-SDI signal having the audio signal A superimposed on the H-Anc of the video signal is shown as 1.5 Gbps SDI (Audio Signal A Embedded Original) In FIG. 7, a plurality of hexagons that constitute 1.5 Gbps SDI (Audio Signal A Embedded Original) each represent one-word data. That is, stream data composed of hexagons arranged behind LN1 in time, among 1.5 Gbps SDI (Audio Signal A Embedded Original), corresponds to the audio signal A having the above-described packet structure as illustrated in FIG. 4.

In this case, when performing the above-described packet structure-maintaining encryption process, the audio encryption section 153 prohibits the encryption process for the ADF, the DID, the DBN, the DC, and the CLK in the audio signal A as illustrated in FIG. 4, and supplies the ADF, the DID, the DBN, the DC, and the CLK as they are to the combining section 16.

Then, as illustrated in FIG. 7, when the CH1 is supplied after the CLK, the audio encryption section 153 encrypts the CHn in the audio signal A (i.e., UDW2 to UDW17 as illustrated in FIG. 4) one word after another, using each of the AES keys C0 to C5 included in the "AES key stream for C" for a separate one of UDW2 to UDW17, and supplies UDW2 to UDW17 as encrypted to the combining section 16 sequentially. In FIG. 7, UDW2 included in the CH1 is being encrypted using the AES key C4 included in the "AES key stream for C".

After encrypting UDW2 to UDW17 sequentially in such a manner, the audio encryption section 153 prohibits the encryption process again, although not shown in the FIG. 7. That is, the ECC and the CS in FIG. 4 are not encrypted, and the ECC and the CS in their original form are supplied from the audio encryption section 153 to the combining section 16.

As a result of the above-described encryption process by the audio encryption section 153, the encrypted audio signal A, a part of which is shown at the bottom of FIG. 7, is obtained and supplied to the combining section 16.

As described above, as for timing of when encryption is performed and when encryption is not performed on the audio signal A to be embedded in the HD-SDI signal (hereinafter, this timing will be referred to as "audio signal encryption ON/OFF timing") in the example of the packet structure-maintaining encryption process, the encryption is in an OFF state for the ADF, the DID, the DBN, the DC, and the CLK, and in an ON state for UDW2 to UDW17 in the CHn that follow, and then again in the OFF state for the ECC and the CS that follow.

Note that, however, the audio signal encryption ON/OFF timing is not limited to the above example with the packet structure-maintaining encryption process. The audio signal encryption ON/OFF timing may vary depending on various design concepts, such as whether there is an audio packet already embedded in the HD-SDI signal, or which Ch of which Gp is encrypted to protect the content. That is, the audio signal encryption ON/OFF timing may change, without being uniform. Even in such a case, the encryption engine used for the video signal (which is, in FIG. 3 and so on, the AES core section 11) operates continuously in a H-ANC period during which embedment of the audio signal A is permitted. Therefore, regardless of at which phase the On/Off of the encryption of the audio signal A is switched, it is possible to uniquely define one AES key within the AES key stream for each one-word data to be encrypted.

Further, use of a reserve bit which is prepared, for example, in an audio control packet or the audio data packet (DID=40hex, SDID=06hex) standardized in SMPTE 427M enables various types of information to be shared between a transmitter and a receiver, which are the encryption apparatus 101 and the decryption apparatus 102 in the content protection system of FIG. 3 and the encryption apparatus 201 and the decryption apparatus 202 in the content protection system of FIG. 6. Examples of such information to be shared therebetween include information that represents which Ch of which Gp of the audio signal A embedded in the HD-SDI signal has been encrypted, i.e., information that represents which of UDW2 to UDW17 in the CHn has been encrypted before transmission in the packet structure-maintaining encryption process, for example.

The decryption process for the encrypted audio signal A to be performed by the decryption apparatus 102 in FIG. 3 or the decryption apparatus 202 of FIG. 6 is basically the inverse of the encryption process described above with reference to FIG. 7. Therefore, description of the decryption process is omitted.

While the content protection systems as illustrated in FIGS. 2, 3, and 6 have been described above as embodiments of the information processing system of the present invention, the present invention is not limited to the above-described embodiments. Various other embodiments of the present invention are possible.

Specifically, for example, the demand to overcome the first and second drawbacks of the information processing system of FIG. 2 can be basically satisfied by adopting the technique of sharing the common key and the encryption engine and decryption engine that employ the common key between the video signal and the audio signal A. Hereinafter, this technique will be referred to as a "video-audio sharing technique". Note that, as described above, the first drawback is the increased circuit scale and the second drawback is that there is the need to establish the new secure means for transferring the common key used exclusively for the audio signal A.

The above-described content protection systems of FIGS. 3 and 6 are embodiments of the information processing system that adopts this video-audio sharing technique. That is, in the content protection systems of FIGS. 3 and 6, the common key shared by the video signal and the audio signal A is the LE key 31, the encryption engine shared by the video signal and the audio signal A is the AES core section 11, and the decryption engine shared by the video signal and the audio signal A is the AES core section 24. In other words, the above-described first and second drawbacks can be overcome if the LE key 31, the AES core section 11, and the AES core section 24 are shared by the video signal and the audio signal A. Thus, not only the content protection systems of FIGS. 3 and 6 but also a content protection system as illustrated in FIG. 8 may be adopted, for example.

Figure 8:
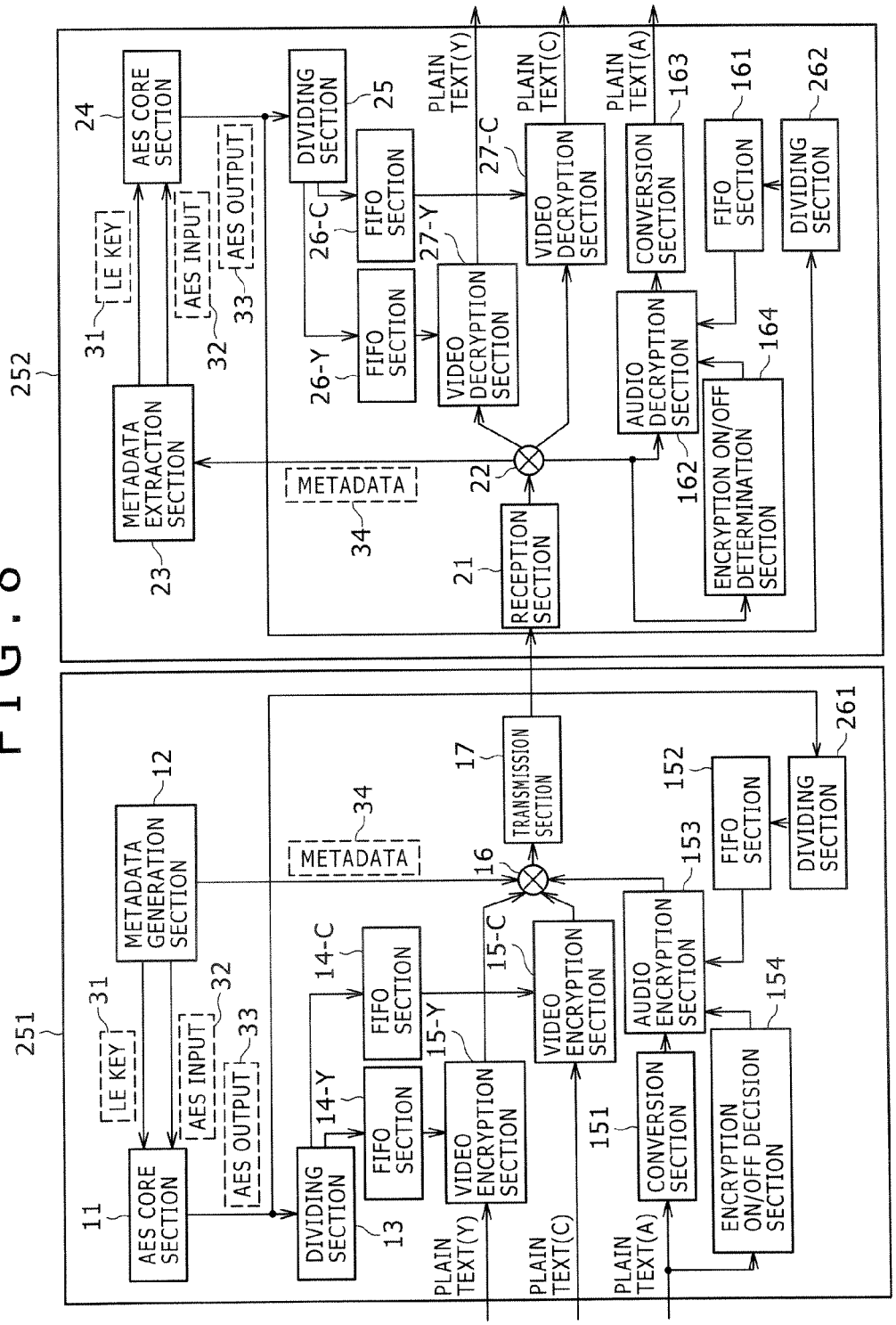
FIG. 8 is a diagram illustrating an exemplary configuration of a content protection system according to yet another embodiment of the present invention.

FIG. 8 illustrates an exemplary configuration of a content protection system as an information processing system according to yet another embodiment of the present invention. This content protection system is different from any of the content protection systems of FIGS. 2, 3, and 6.

In FIG. 8, elements that have corresponding elements in FIG. 6 are denoted by the same reference numerals as the corresponding elements in FIG. 6, and descriptions of such elements are omitted as appropriate.

As compared to the encryption apparatus 201 in FIG. 6, an encryption apparatus 251 in the content protection system of FIG. 8 additionally includes a dividing section 261. Specifically, in the content protection system of FIG. 6, the AES keys for the color signal C supplied from the dividing section 13 to the FiFo section 14-C are supplied to the FiFo section 152 as well so that the AES keys can be used also for the audio signal A. On the other hand, in the content protection system of FIG. 8, the dividing section 261 is provided independently of the dividing section 13, and the dividing section 261 divides the AES output 33 into pieces of 10-word data, and each 10-word data is supplied to the FiFo section 152 as the AES key for the audio signal A.

Similarly, as compared to the decryption apparatus 202 in FIG. 6, a decryption apparatus 252 in the content protection system of FIG. 8 additionally includes a dividing section 262. Specifically, in the content protection system of FIG. 6, the AES keys for the color signal C supplied from the dividing section 25 to the FiFo section 26-C are supplied to the FiFo section 161 as well so that the AES keys can be used also for the audio signal A. On the other hand, in the content protection system of FIG. 8, the dividing section 262 is provided independently of the dividing section 25, and the dividing section 262 divides the AES output 33 into pieces of 10-word data, and each 10-word data is supplied to the FiFo section 161 as the AES key for the audio signal A.

As in the content protection system of FIG. 3, the encryption On/Off decision section 154 and the encryption On/Off determination section 164 may be omitted while the functions of the encryption On/Off decision section 154 and the encryption On/Off determination section 164 are delegated to the audio encryption section 153 and the audio decryption section 162, respectively.

Further, for example, in the above-described embodiments, the metadata 34, the encrypted audio signal A, and the encrypted video signal are transmitted together from the encryption apparatus on the transmitting side to the decryption apparatus on the receiving side, i.e., as the audio-metadata-superimposed encrypted video signal. However, the metadata 34, the encrypted audio signal A, and the encrypted video signal need not be transmitted together.

For example, although not shown, an encryption apparatus (hereinafter referred to as an "audio-dedicated encryption apparatus") for encrypting the audio signal A that is to be embedded in the HD-SDI signal and a decryption apparatus (hereinafter referred to as a "audio-dedicated decryption apparatus") for decrypting the encrypted audio signal A outputted from this encryption apparatus may be provided separately, as necessary.

Further, for example, the metadata 34 may be transmitted from the transmitting side to the receiving side over a different transmission path from that of the encrypted video signal and the encrypted audio signal A.

Still further, although the AES cipher is adopted as the cryptographic algorithm in the above-described embodiments, the present invention is not limited to this example. For example, the present invention is also applicable to various other cryptographic algorithms, such as DES (Data Encryption Standard), 3DES, etc.

Note that the above-described series of processes may be implemented either by hardware or by software. In the case where the series of processes are implemented by software, a program that constitutes the software and which is stored in a program storage medium is installed into a dedicated computer or, for example, a general-purpose personal computer that, when various programs are installed therein, becomes capable of performing various functions.

FIG. 9 is a block diagram illustrating an exemplary structure of a personal computer that performs the above-described series of processes in accordance with the program. That is, in the case where the above-described series of processes are performed in accordance with the program, for example, each of the encryption apparatus and the decryption apparatus may be constituted by the whole or a part of a personal computer having the structure as illustrated in FIG. 9.

In FIG. 9, a central processing unit (CPU) 301 performs various processes in accordance with a program stored in a read only memory (ROM) 302 or a storage section 308. The program executed by the CPU 301, data, and the like are stored in a random access memory (RAM) 303 as appropriate. The CPU 301, the ROM 302, and the RAM 303 are connected to one another via a bus 304.

An input/output interface 305 is also connected to the CPU 301 via the bus 304. An input section 306 formed by a keyboard, a mouse, and/or a microphone and an output section 307 formed by a display and/or a loudspeaker are connected to the input/output interface 305. The CPU 301 performs the various processes in response to instructions inputted via the input section 306. Then, the CPU 301 outputs results of such processes to the output section 307.

The storage section 308 connected to the input/output interface 305 is formed by a hard disk, for example, and stores the program executed by the CPU 301 and various types of data. A communication section 309 communicates with an external device via a network such as the Internet or a local area network.

The program may be acquired via the communication section 309 and stored in the storage section 308.

When a removable medium 311, such as a magnetic disk, an optical disk, a magneto-optical disk, a semiconductor memory, etc., is mounted on a drive 310 connected to the input/output interface 305, the drive 310 drives the removable medium 311 to acquire a program or data recorded thereon. The acquired program or data is transferred to and stored in the storage section 308 as necessary.

The program storage medium that store the program to be installed into the computer so as to be executable by the computer is, as illustrated in FIG. 9, constituted by the removable medium 311, the ROM 302 for temporary or permanent storage of the program, the hard disk forming the storage section 308, or the like. The removable medium 311 is a packaged medium, and examples of the removable medium 311 include a magnetic disk (including a flexible disk), an optical disk (including a CD-ROM (Compact Disc-Read Only Memory) and a DVD (Digital Versatile Disc)), a magneto-optical disk, and a semiconductor memory. The storage of the program into such a program storage medium is achieved as necessary via the communication section 309, which is an interface for a router, a modem, or the like, employing a wired or wireless communication medium such as the local area network, the Internet, or digital satellite broadcasting.

Note that the steps implemented by the program stored in the program storage medium and described in the present specification may naturally be performed chronologically in order of description but need not be performed chronologically. Some steps may be performed in parallel or independently of one another.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
a first information processing apparatus transmitting a content having a video signal and an audio signal; and
a second information processing apparatus receiving the content;
wherein said first information processing apparatus includes
a first key generator configured to generate a first key,
a video encryptor configured to encrypt the video signal with the first key generated by the first key generator in accordance with a predetermined system,
an audio encryptor configured to encrypt the audio signal with the first key generated by the first key generator in accordance with the predetermined system and
a transmitter configured to transmit the content having the video signal encrypted by the video encryptor and the audio signal encrypted by the audio encryptor; and
wherein said second information processing apparatus includes
a receiver configured to receive the content transmitted from said first information processing apparatus,
a second key generator configured to generate a second key corresponding to the first key,
a video decryptor configured to decrypt the encrypted video signal included in the content received by the receiver with the second key generated by the second key generator in accordance with the predetermined system, and
an audio decryptor configured to decrypt the encrypted audio signal included in the content received by the receiver with the second key generated by the second key generator in accordance with the predetermined system,
wherein the predetermined system is an AES (Advanced Encryption Standard) cipher and each of said key generator, said video encryptor, and said audio encryptor performs processing in accordance with SMPTE 427M "Link Encryption for 1.5 Gb/s1 Serial Digital Interface".

2. An information processing processing method employed in an information processing system comprising a first information processing apparatus for transmitting a content having a video signal and an audio signal and a second information processing apparatus for receiving the content,
wherein the first information processing apparatus includes the steps of
generating a first key,
encrypting the video signal with the generated first key in accordance with a predetermined system,
encrypting the audio signal with the generated first key in accordance with the predetermined system,
transmitting the content having the encrypted video signal and the encrypted audio signal; and
wherein the second information processing apparatus includes the steps of
receiving the content transmitted from the first information processing apparatus,
generating a second key corresponding to the first key,
decrypting the encrypted video signal included in the received content with the generated second key in accordance with the predetermined system, and
decrypting the encrypted audio signal included in the received content with the generated second key in accordance with the predetermined system,
wherein the predetermined system is an AES (Advanced Encryption Standard) cipher and each of said key generator, said video encryptor, and said audio encryptor performs processing in accordance with SMPTE 427M "Link Encryption for 1.5 Gb/s1 Serial Digital Interface".

3. An information processing apparatus for transmitting a content including a video signal and an audio signal, the apparatus comprising:
a key generator configured to generate a key;
a video encryptor configured to encrypt the video signal with the key generated by said key generator in accordance with a predetermined system;
an audio encryptor configured to encrypt the audio signal with the key generated by said key generator in accordance with the predetermined system; and
a transmitter configured to transmit the content including the video signal encrypted by said video encryptor and the audio signal encrypted by said audio encryptor,
wherein the predetermined system is an AES (Advanced Encryption Standard) cipher and each of said key generator, said video encryptor, and said audio encryptor performs its process in accordance with SMPTE 427M "Link Encryption for 1.5 Gb/s1 Serial Digital Interface".

4. The information processing apparatus according to claim 3, wherein said transmitter further superimposes the key generated by said key generator on the content to transmit the key together with the content.

5. The information processing apparatus according to claim 3, wherein said transmitter transmits the content using HD-SDI (Bit-Serial Digital Interface for High-Definition Television Systems) standardized in SMPTE (Society of Motion Picture and Television Engineers) 292M.

6. An information processing method employed in an information processing apparatus for transmitting a content including a video signal and an audio signal, the method comprising:
generating a key;
encrypting the video signal with the generated key in accordance with a predetermined system;
encrypting the audio signal with the generated key in accordance with the predetermined system; and
transmitting the content including the encrypted video signal and the encrypted audio signal,
wherein the predetermined system is an AES (Advanced Encryption Standard) cipher and each of generating the key, encrypting the video signal, and encrypting the audio signal is performed in accordance with SMPTE 427M "Link Encryption for 1.5 Gb/s1 Serial Digital Interface".

7. A program to be executed by a computer for controlling a series of processes up to transmission of a content including a video signal and an audio signal, the program allowing the computer to perform a method comprising:
generating a key;
encrypting the video signal with the generated key in accordance with a predetermined system;
encrypting the audio signal with the generated key in accordance with the predetermined system; and
transmitting the content having the encrypted video signal and the encrypted audio signal,
wherein the predetermined system is an AES (Advanced Encryption Standard) cipher and each of generating the key, encrypting the video signal, and encrypting the audio signal is performed in accordance with SMPTE 427M "Link Encryption for 1.5 Gb/s1 Serial Digital Interface".

8. An information processing apparatus for, when a content having a video signal encrypted with a first key in accordance with a predetermined system and an audio signal encrypted with the first key in accordance with the predetermined system is transmitted from another information processing apparatus, receiving the content and decrypting the received content, the apparatus comprising:
a receiver configured to receive the content transmitted from the other information processing apparatus;
a key generator configured to generate a second key corresponding to the first key;
a video decryptor configured to decrypt the encrypted video signal included in the content received by said receiver with the second key generated by said key generator in accordance with the predetermined system; and
an audio decryptor configured to decrypt the encrypted audio signal included in the content received by said receiver with the second key generated by said key generator in accordance with the predetermined system,
wherein the predetermined system is an AES (Advanced Encryption Standard) cipher and each of said key generator, said video encryptor, and said audio encryptor performs processing in accordance with SMPTE 427M "Link Encryption for 1.5 Gb/s1 Serial Digital Interface".

9. The information processing apparatus according to claim 8, wherein,
the content transmitted from the other information processing apparatus and received by said receiver has the first key superimposed thereon, and
said key generator extracts the first key from the content received by said receiver to generate the second key based on the first key.

10. The information processing apparatus according to claim 8, wherein said receiver receives the content using HD-SDI (Bit-Serial Digital Interface for High-Definition Television Systems) standardized in SMPTE (Society of Motion Picture and Television Engineers) 292M.

11. The information processing apparatus according to claim 8, wherein,
each of said key generator, said video decryptor, and said audio decryptor performs its process in accordance with the SMPTE 427M.

12. An information processing method employed in an information processing apparatus for, when a content including a video signal encrypted with a first key in accordance with a predetermined system and an audio signal encrypted with the first key in accordance with predetermined system is transmitted from another information processing apparatus, receiving the content and decrypting the received content, the method comprising:
receiving the content transmitted from the other information processing apparatus;
generating a second key corresponding to the first key;
decrypting the encrypted video signal included in the received content with the generated second key in accordance with the predetermined system; and
decrypting the encrypted audio signal included in the received content with the generated second key in accordance with the predetermined system,
wherein the predetermined system is an AES (Advanced Encryption Standard) cipher and each of said key generator, said video encryptor, and said audio encryptor performs processing in accordance with SMPTE 427M "Link Encryption for 1.5 Gb/s1 Serial Digital Interface".

13. A program to be executed by a computer for controlling an information processing apparatus for, when a content including a video signal encrypted with a first key in accordance with a predetermined system and an audio signal encrypted with the first key in accordance with the predetermined system is transmitted from another information processing apparatus, receiving the content and decrypting the received content, the program allowing the computer to perform a method comprising:
allowing the information processing apparatus to receive the content transmitted from the other information processing apparatus;
generating a second key corresponding to the first key;
decrypting the encrypted video signal included in the content received by the information processing apparatus with the generated second key in accordance with the predetermined system; and
decrypting the encrypted audio signal included in the content received by the information processing apparatus with the generated second key in accordance with the predetermined system,
wherein the predetermined system is an AES (Advanced Encryption Standard) cipher and each of said key generator, said video encryptor, and said audio encryptor performs processing in accordance with SMPTE 427M "Link Encryption for 1.5 Gb/s1 Serial Digital Interface".

* * * * *